United States Patent [19]

Kucala

[11] Patent Number: 5,832,489
[45] Date of Patent: Nov. 3, 1998

[54] METHOD AND APPARATUS FOR SYNCHRONIZING INFORMATION ON TWO DIFFERENT COMPUTER SYSTEMS

[75] Inventor: Gregory R. Kucala, Santa Cruz, Calif.

[73] Assignee: 3 Com Corporation, Santa Clara, Calif.

[21] Appl. No.: 947,216

[22] Filed: Oct. 8, 1997

Related U.S. Application Data

[63] Continuation of Ser. No. 544,927, Oct. 18, 1995, Pat. No. 5,727,202.

[51] Int. Cl.$^6$ ........................................... G06F 17/30
[52] U.S. Cl. .................................. 707/10; 707/1
[58] Field of Search .................. 707/1–10, 100–104, 707/200–206; 395/281, 200.01; 701/29; 702/186

[56] References Cited

U.S. PATENT DOCUMENTS

| | | | |
|---|---|---|---|
| 4,432,057 | 2/1984 | Daniell et al. | 364/300 |
| 4,807,182 | 2/1989 | Queen | 364/900 |
| 4,866,611 | 9/1989 | Cree et al. | 364/300 |
| 4,875,159 | 10/1989 | Cary et al. | 364/200 |
| 4,956,809 | 9/1990 | George et al. | 364/900 |
| 5,001,628 | 3/1991 | Johnson et al. | 707/10 |
| 5,065,360 | 11/1991 | Kelly | 395/800 |

(List continued on next page.)

OTHER PUBLICATIONS

Cobb et al., "Paradox 3.5 Handbook 3rd Edition", Bantam (1991), pp. 803–816.

Alieri, "The Best Book of: WordPerfect Version 5.0", Hayden Books (1988), pp. 153–165 and 429–435.

User Manual for PC–Link for the B.O.S.S. and the PC–Link for the B.O.S.S., Traveling Software, Inc. (1989).

User Manual for Connectivity Pack for the HP 95LX, Hewlett Packard Company (1991).

Organizer Link II Operation Manual, Sharp Electronics Corporation, No Date.

"Open Network Computing—Technical Overview," Sun Technical Report, Sun Microsystems, Inc., pp. 1–32 (1987).

Zahn et al., Network Computing Architecture, pp. 1–11, 19–31; 87–115; 117–133; 187–199; 201–209 (1990).

IntelliLink Brochure (1990).

"Logical Connectivity: Applications, Requirements, Architecture, and Research Agenda," Stuart Madnick & Y. Richard Wang, MIT, System Sciences, 1991, Hawaii Int'l, vol. 1, IEEE, Jun. 1991.

"Automatically Synchronized Objects", Research Disclosure #29261, p. 614 (Aug. 1988). No copy available.

"FRx extends reporting power of Platinum Series: (IBM Desktop Software's line of accounting software)", Doug Dayton, PC Week, v. 8, No. 5, p. 29(2), Feb. 1991.

*Primary Examiner*—Thomas G. Black
*Assistant Examiner*—Ruay Lian Ho
*Attorney, Agent, or Firm*—Blakely, Sokoloff, Taylor & Zafman LLP

[57] ABSTRACT

Many users of handheld computing devices or "palmtops" also own personal computers running applications that manage data similar to the data carried in the palmtops. In such cases, the users are likely to want the data on the palmtop to be synchronized with the data on the personal computer. A method and apparatus reconciles records on a palmtop with corresponding records on a personal computer.

20 Claims, 4 Drawing Sheets

U.S. PATENT DOCUMENTS

| | | | |
|---|---|---|---|
| 5,142,619 | 8/1992 | Webster, III | 395/157 |
| 5,187,787 | 2/1993 | Skeen et al. | 395/600 |
| 5,210,868 | 5/1993 | Shimada et al. | 395/600 |
| 5,237,678 | 8/1993 | Kuechler et al. | 395/600 |
| 5,251,291 | 10/1993 | Malcolm | 395/146 |
| 5,261,045 | 11/1993 | Scully et al. | 395/161 |
| 5,261,094 | 11/1993 | Everson et al. | 395/600 |
| 5,272,628 | 12/1993 | Koss | 364/419.19 |
| 5,283,887 | 2/1994 | Zachery | 395/500 |
| 5,301,313 | 4/1994 | Terada et al. | 395/600 |
| 5,315,709 | 5/1994 | Alston, Jr. et al. | 395/600 |
| 5,327,555 | 7/1994 | Anderson | 395/600 |
| 5,333,252 | 7/1994 | Brewer, III et al. | 395/148 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,392,390 | 2/1995 | Crozier | 395/161 |
| 5,434,994 | 7/1995 | Shaheen et al. | 395/500 |
| 5,463,772 | 10/1995 | Thompson et al. | 707/101 |
| 5,475,833 | 12/1995 | Dauerer et al. | 395/600 |
| 5,519,606 | 5/1996 | Frid-Nielsen et al. | 364/401 |
| 5,537,592 | 7/1996 | King et al. | 707/200 |
| 5,544,356 | 8/1996 | Robinson et al. | 707/205 |
| 5,574,859 | 11/1996 | Yeh | 395/281 |
| 5,592,669 | 1/1997 | Robinson et al. | 707/206 |
| 5,666,553 | 9/1997 | Crozier | 395/803 |
| 5,684,990 | 11/1997 | Boothby | 395/619 |
| 5,696,702 | 12/1997 | Skinner et al. | 702/186 |
| 5,701,423 | 12/1997 | Crozier | 395/335 |
| 5,729,452 | 3/1998 | Smith et al. | 701/29 |

METHOD AND APPARATUS FOR SYNCHRONIZING INFORMATION ON TWO DIFFERENT COMPUTER SYSTEMS

This is a continuation of application Ser. No. 08/544,927, filed Oct. 18, 1995 and now U.S. Pat. No. 5,727,202.

FIELD OF THE INVENTION

This invention relates to the field of handheld computing devices. Specifically, the present invention discloses a method and apparatus for synchronizing information between a desktop computing system and a handheld computing device.

BACKGROUND OF THE INVENTION

Handheld computing devices or "palmtops" typically weigh less than a pound and fit in a pocket. These palmtops generally provide some combination of personal information management, database functions, word processing and spreadsheets. Users of palmtops may also own personal computers (PCs) running applications that manage data similar to the data carried in the palmtops. In such cases, the user normally would want the data on their palmtop to be easily synchronized with the data on their PC.

A number of programs today transfer data between palmtops and PCs, but they are currently limited in functionality. Some programs transfer all the information from the palmtop to the PC without regard for the prior content on the PC. These programs assume that changes to that particular data are only made on the palmtop, and that the changes made on the palmtop take precedence over any changes made on the PC. As a result, any independent updates made directly on the PC will be lost.

Other methods use 'flags' to facilitate synchronization. These methods create update 'flags' in each record that has changed, both on the palmtop and the PC. Corresponding files on the palmtop and the PC are then compared, and if one or more flags are set in a file, the file is recognized as having changed. If both the palmtop and PC files have changed, the flags are used to determine which records need to be updated in the other file. The databases of most existing programs, however, do not contain such flags since the databases of most existing programs were not designed to be synchronized. Thus, a different method must be used to synchronize data from programs that are already on the market.

Some programs attempt to synchronize the data on the PC with the palmtop by comparing the information in each application and prompting the user for answers to determine which data to overwrite. For example, U.S. Pat. No. 5,392, 390 describes a method for reconciling information between two calendar database files by interrogating the user about which file to update when a difficult case arises. Although these types of programs provide an advantage over programs that assume only one database has changed since they do not indiscriminately overwrite data, they are cumbersome and time consuming. Using these methods, users may have to spend an inordinate amount of time answering questions whenever they attempt to synchronize information between their palmtops and their PCs.

SUMMARY OF THE INVENTION

It is therefore an object of the present invention to provide a solution to the problem of synchronizing records on two different computer systems. It is a further object of the present invention to present a method that reconciles two changeable databases without any user interactions. Specifically, the present invention discloses a method and apparatus for automatically reconciling records in corresponding files on palmtop and a personal computer (PC) by comparing the records in the palmtop and PC files with the records in a backup file in a backup directory from the previous synchronization.

When a user is ready to synchronize information on the two computer systems, the palmtop is connected to the PC. The present invention then compares each record of a file on the palmtop with the records in the backup file in the backup directory to determine whether each record on the palmtop file is new, updated or if it has been deleted from the palmtop file. Next, a comparison is performed between the contents of the corresponding file on the PC and the backup file in the backup directory to determine whether each record on the PC is new, updated or if it has been deleted from the PC file. The results of both compares are stored, e.g., in a new file called a reconcile file, or a temporary data structure. After all the records in both files have been checked, the results of the compare, whether stored in a reconcile file or temporary data structure, are copied over the selected files on the palmtop, the PC and the backup file in the backup directory, thus guaranteeing that all three files are identical after the synchronization. The reconcile file is then deleted.

Other objects, features and advantages of the present invention will be apparent from the accompanying drawings, and from the detailed description.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

The present invention discloses a method and apparatus for automatically reconciling records in a file on a palmtop with records in a corresponding file on a personal computer. In the following description, for purposes of explanation, specific nomenclature is set forth to provide a thorough understanding of the present invention. However, it will be apparent to one skilled in the art that these specific details are not required to practice the present invention. Furthermore, the present invention is described using one possible embodiment. For example, the present invention is described with reference to calendar files. However, any type of data files can be synchronized using the teachings of the present invention. Thus, the teachings of the present invention can be used to synchronize to-do lists, address lists, phone lists, and any other record oriented database file.

Figure 1:
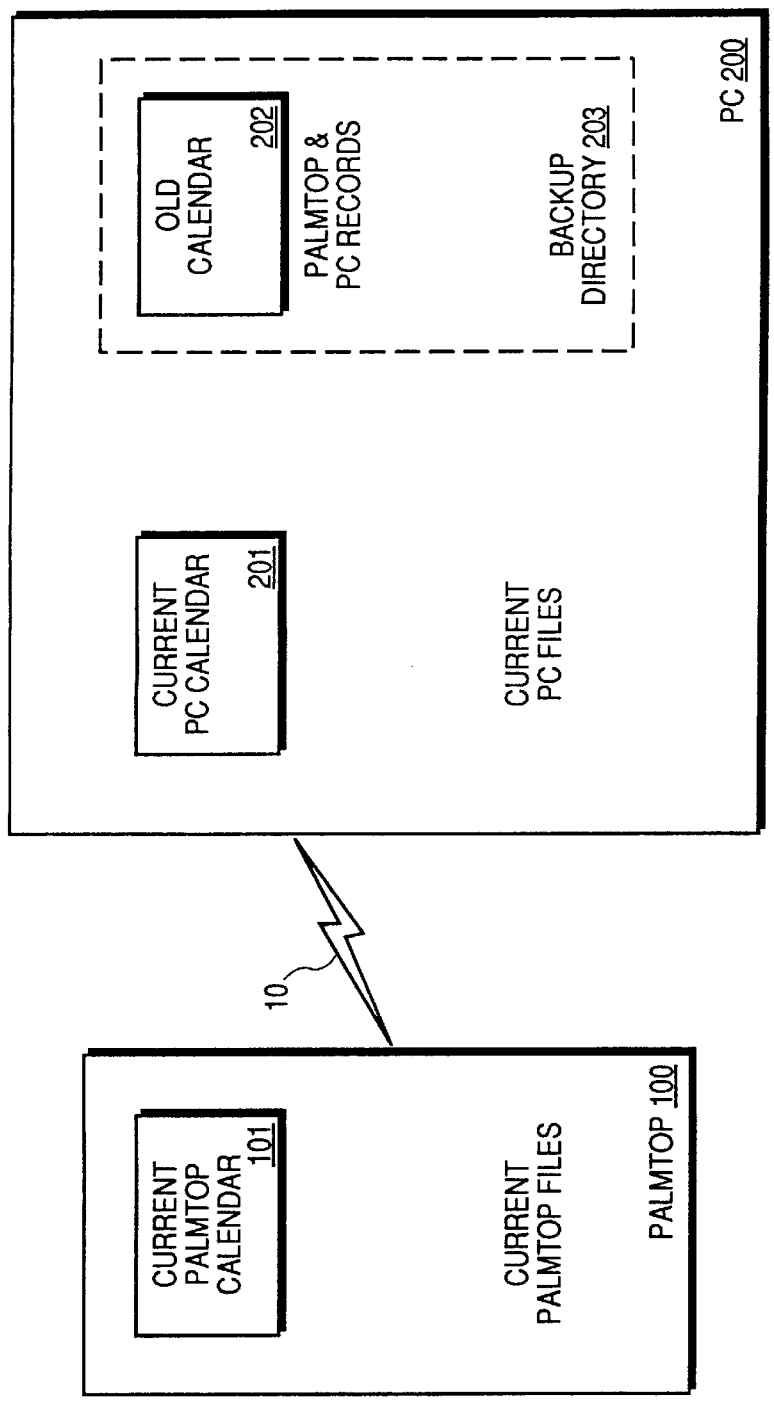
FIG. 1 illustrates a palmtop connected to a PC containing a backup file from the previous palmtop-PC synchronization.

Referring to FIG. 1, when a user is ready to synchronize information on the two computer systems, palmtop computer 100 is connected to personal computer (PC) 200 with a communication link 10. The communication link may consist of a serial data line or any other type of data communication line between the palmtop computer 100 and PC 200. Palmtop computer 100 and PC 200 each contain versions of corresponding files, 101 and 201. It is possible and likely that corresponding files 101 and 201 have been altered with new, modified, and deleted records since the last synchronization.

Figure 2:
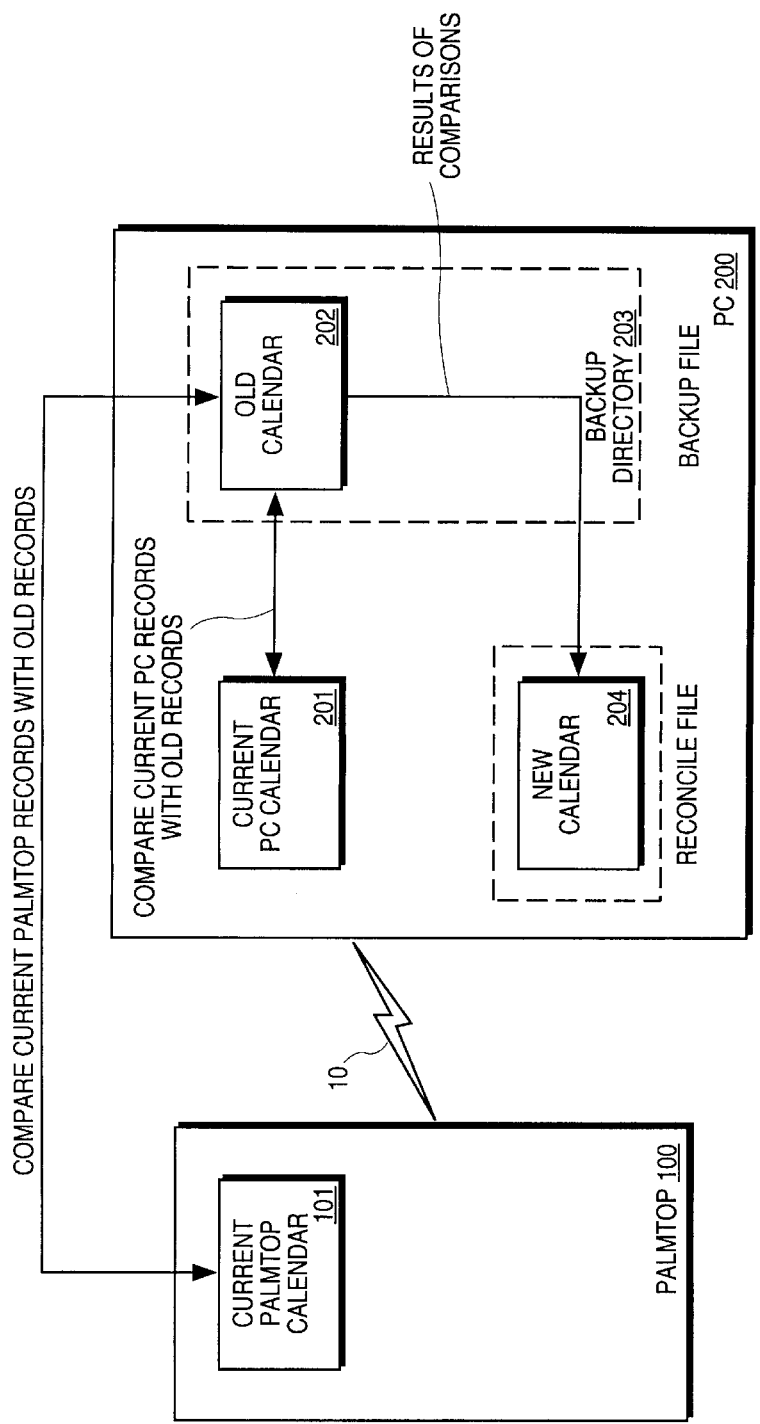
FIG. 2 illustrates the comparison of a current palmtop calendar file and a current PC calendar file with the backup calendar file in the backup directory on the PC, and the writing of the results to a reconcile file.

The synchronization process is conceptually illustrated in FIG. 2. The synchronization process is controlled by computer instructions that can be stored on magnetic media on the PC 200. The present invention uses a backup directory 203 stored on the PC. Backup directory 203 contains a backup file that stores the file state from a previous synchronization of the PC 200 and the palmtop 100. The backup file is used to reconcile the records in a file on the palmtop computer 100 with the corresponding file in the PC.

To create an initial backup directory 203, the palmtop and PC files are merged. For example, if the PC 200 starts with a calendar file and the palmtop 100 does not have a calendar file, then PC calendar file 201 will be copied into a backup calendar file 202 in the backup directory 203. Backup calendar file 202 in backup directory 203 will be used to create the same records on palmtop 100, thus synchronizing palmtop calendar file 101 and PC calendar file 201 with backup calendar file 202 in backup directory 203. If both PC 200 and palmtop 100 start out with calendar files, then the two calendar files will be merged, and exact duplicate records will be filtered out. The resulting merged file will then be used for the palmtop calendar file 101, PC calendar file 201, and the backup calendar file 202.

Figure 3:
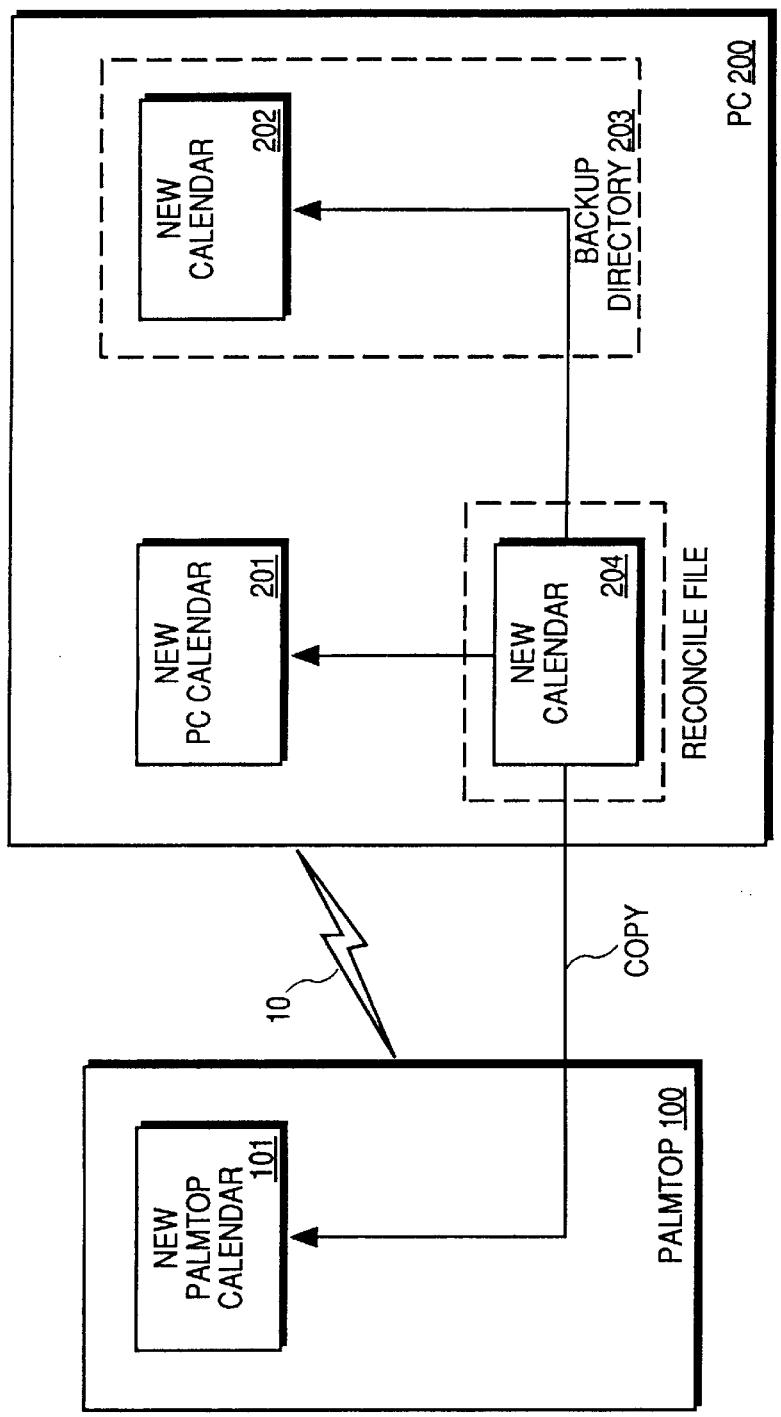
FIG. 3 illustrates the copying of the updated information in the reconciled calendar file to the backup calendar file in the backup directory, the PC and the palmtop.
Figure 4:
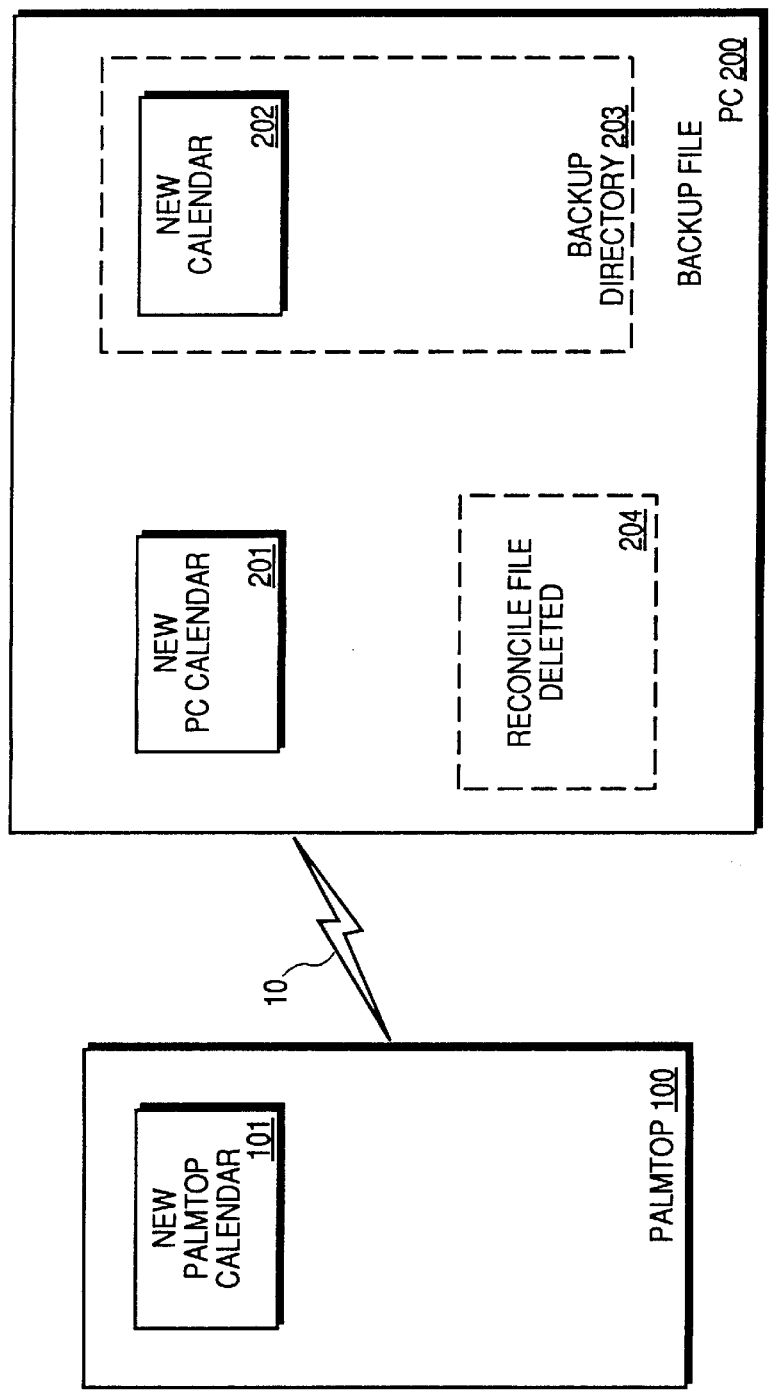
FIG. 4 illustrates the final result of the present invention, with the deletion of the reconcile file, leaving the backup calendar file in the backup directory, the PC calendar file and the palmtop calendar file synchronized.

FIG. 2 illustrates the record synchronization process where a PC calendar file 201 and a palmtop calendar file 101 each contain a plurality of records that have been modified. The PC also contains backup calendar file 202 stored in backup directory 203, comprising a calendar file from the previous synchronization between palmtop computer 100 and PC 200. The plurality of records in the PC calendar file 201 and the corresponding palmtop calendar file 101 are then each compared to the records in the corresponding backup calendar file 202 in backup directory 203 to determine new, updated or deleted records. In one embodiment, the results of the compare operations are then used to create a single reconcile file 204 that contains all the new records, modified records, and unmodified records. The deleted records are removed. The contents of the reconcile file 204 are then copied to PC file 201, palmtop file 101, and backup calendar file 202 in backup directory 203 (FIG. 3). All three calendar files are thus synchronized. Finally reconcile file 204 is then deleted as illustrated in FIG. 4.

In another embodiment, the intermediate results of the compare operations may be stored in a temporary data structure that contains all the new records, modified records, and unmodified records. The deleted records are removed. The contents of the data structure are then copied to PC file 201, palmtop file 101, and backup calendar file 202 in backup directory 203 (FIG. 3). All three calendar files are thus synchronized. The temporary data structure is no longer used.

To fully describe what occurs during the comparison process, Table 1 lists all the possible cases and what occurs during the record synchronization process, according to one embodiment.

TABLE 1

| CONDITION | RESULT | METHOD |
|---|---|---|
| Record was added to a file. | Record is copied into reconcile file. | Record was not found in backup file or other file. |
| Record was added into both files and with exactly the same contents. | Record is copied into reconcile file. | Record was not found in backup file but matched exactly a record in the other file. |
| Record was deleted from one file but still exists in the other. | Neither record is copied into the reconcile file. | Record was found in one file and the backup file but not the other file. |
| Record was deleted from one file but the same record in other file has been changed. | Copy changed record into the reconcile file. | The record that was deleted is gone in both files so it cannot be copied. The changed record acts like a new record since it does not exist in the backup file. |
| Record was deleted from both files. | Neither record is copied into reconcile file. | The record that was deleted is gone from both files so it should not be copied. |
| Record was modified in one file. | Copy changed record into the reconcile file. | Changed record is not found in backup file making it appear as a new record. The original record in the other file matches a record in the backup but not in the original file making it a deleted record. |
| Same record was changed in both files exactly the same way. | Record is copied into the reconcile file. | Both records are new but since they match exactly only one record is created in the reconcile file for them. |
| Same record was changed in both files, | Both records are copied into the | Both records appear as new records since neither match |

TABLE 1-continued

| CONDITION | RESULT | METHOD |
| --- | --- | --- |
| but not in the exact same way. | reconcile file. | any records in the backup file. |

The first column of Table 1 lists the possible conditions of the records in the files to be reconciled. The second column of Table 1 describes how each type of record condition is handled during the reconciliation process. The third column explains how each condition is recognized by the present invention.

For example, in one embodiment, if a record is added into the calendar file on the palmtop 100 and a different record is added into the corresponding calendar file on the PC 200, then the synchronization system of the present invention will copy both records into the reconcile file. The reconcile file will later be copied back into the backup calendar file in the backup directory, the palmtop calendar file and the PC calendar file, synchronizing the records in the three calendar files. Similarly, if the same record is changed in one way in the palmtop calendar file and changed a different way in the PC calendar file, then both changed records will be copied into the reconcile file. Given that neither altered record will match any records in the backup file, both records will then appear as new records in the backup calendar file in the backup directory, the palmtop calendar file and the PC calendar file.

In the preferred embodiment of the present invention, key contents of a record are identified. Key contents consist of an index field or a group of fields that can be used for record compares. Matching key contents indicate that this is the same record. The preferred embodiment uses these key contents to reduce the time to find matching records and perform the compare.

The embodiment of the present invention as described above assumes that the palmtop files and the PC files have records with identical field order and field names. However, this is not necessary to practice the synchronization method of the present invention. In cases where file formats are non-identical, prior art methods exist to perform translations or conversions of file formats, thus allowing the present invention to function after the non-identical file formats are in a format where records can be compared. This flexibility in file formats is an important feature of the present invention because it allows information to be synchronized between palmtop and PC applications that use different file systems and file formats.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for reconciling a first file on a first computer system with a corresponding second file on a second computer system, said first file and said second file each containing records, said method comprising:

comparing said first file and said corresponding second file with a backup file containing records from a previous reconciliation of said first file and said corresponding second file to identify new, modified or deleted records;

creating a reconcile file containing information pertaining to said new, modified or deleted records identified in said step of comparing; and copying contents of said reconcile file to said first file, said corresponding second file and a new backup file.

2. The method as described in claim 1 wherein said first file, said corresponding second file and backup file are calendar files.

3. The method as claimed in claim 1 wherein creating a reconcile file comprises:

copying a first record from said first file into said reconcile file when an identical said first record is added to said first file and said corresponding second file, and said first record is not in said backup file.

4. The method as described in claim 3 wherein said second file resides on a palmtop.

5. A method for reconciling a first file, a second file corresponding to said first file, and a backup file, said backup file containing records from a previous reconciliation, said method comprising:

copying a first record from said first file into a reconcile file when said first record is added to said first file, and said first record is not in said backup file;

copying a second record from said first file into said reconcile file when an identical said second record is added to said first file and said corresponding second file, and said second record is not in said backup file;

copying a third record in said first file into said reconcile file when said third record is modified in said first file and a corresponding third record is deleted from said second file, and said third record in said first file is not in said backup file;

copying a fourth record from said first file into said reconcile file when said fourth record is modified in said first file, and said fourth record is not in said backup file;

copying a fifth record from said first file into said reconcile file when said fifth record in said first file is modified and an identical modification is made to a corresponding fifth record in said second file, and said fifth record in said first file and said corresponding fifth record in said second file are not in said backup file; and copying a sixth record from said first file and a corresponding sixth record from said second file into said reconcile file when said sixth record in said first file is modified and a different modification is made to said corresponding sixth record in said second file, and said sixth record in said first file and said corresponding sixth record in said second file are not in said backup file.

6. The method as described in claim 5 wherein said first file, said corresponding second file and said backup file are calendar files.

7. The method as described in claim 1 further including the step of creating said backup file containing said records from said previous reconciliation of said first file and said corresponding second file prior to performing the steps of claim 1.

8. The method as described in claim 1 further including the step of comparing said first file with said corresponding second file and with said backup file to determine new, updated or deleted records.

9. An apparatus for reconciling records in corresponding files, said apparatus comprising the elements of:

a first computer, said first computer comprising a first file containing records;

a second computer, said second computer comprising a second file containing records and a backup file containing records from a previous reconciliation between said first computer and said second computer, said second file corresponding to said first file;

a communications link for linking said first computer and said second computer; and a reconcile program on said second computer, said reconcile program for comparing said first file and said second file with said backup file to create a reconcile file by identifying new, modified or deleted records.

10. The apparatus as described in claim 9 wherein said first file, said second file and said backup file are calendar files.

11. The apparatus as claimed in claim 7 wherein said reconcile program copies a first record in said first file into said reconcile file when said first record is modified in said first file, a corresponding first record is deleted from said second file, and said first record in said first file is not in said backup file.

12. The apparatus as described in claim 11 wherein said second computer is a palmtop.

13. An article of manufacture comprising a computer usable mass storage medium having computer readable program code means embodied therein for causing a processing means to reconcile a first file and a second file, said second file corresponding to said first file, said first and said second files each containing records, said computer readable program code means in said article of manufacture performing the steps of:

comparing said first file and said corresponding second file with a backup file containing records from a previous reconciliation of said first file and said corresponding second file to identify new, modified or deleted records:

creating a reconcile file containing information pertaining to said new, modified or deleted records identified in said step of comparing; and copying contents of said reconcile file to said first file, said corresponding second file and a new backup file.

14. The article of manufacture as described in claim 13 wherein said first file, said second file and said backup file are calendar files.

15. The article of manufacture as described in claim 13 wherein said means for storing the results of said step of comparing comprises means for creating a reconcile file containing said results.

16. The article of manufacture as described in claim 13 wherein said means for storing the results of said step of comparing comprises means for creating a temporary data structure containing said results.

17. The article of manufacture as described in claim 13 wherein said computer readable program code means further performs the step of:

copying a first record from said first file into said reconcile file when said first record in said first file is modified and an identical modification is made to a corresponding first record in said second file, and said first record in said first file and said corresponding first record in said second file are not in said backup file.

18. The article of manufacture as described in claim 13 wherein said computer readable program code means further performs the step of:

copying a first record from said first file and a corresponding second record from said second file into said reconcile file when said first record in said first file is modified version of a third record in said backup file and said corresponding second record from said second file is a different modified version of said third record in said backup file, and said first record in said first file and said second record in said second file are not in said backup file.

19. The method as described in claim 13 further including the step of creating said backup file containing said records from said previous reconciliation of said first file and said corresponding second file prior to performing the steps of claim 11.

20. The method as described in claim 13 further including the step of comparing said first file with said corresponding second file and with said backup file to determine new, updated or deleted records.

* * * * *